United States Patent
Zheng et al.

(10) Patent No.: US 11,216,375 B2
(45) Date of Patent: Jan. 4, 2022

(54) DATA CACHING

(71) Applicant: Hangzhou Zhicun Intelligent Technology Co., Ltd., Hangzhou (CN)

(72) Inventors: Qilin Zheng, Hangzhou (CN); Shaodi Wang, Hangzhou (CN)

(73) Assignee: Hangzhou Zhicun Intelligent Technology Co., Ltd., Hangzhou (CN)

( * ) Notice: Subject to any disclaimer, the term of this patent is extended or adjusted under 35 U.S.C. 154(b) by 139 days.

(21) Appl. No.: 16/849,913

(22) Filed: Apr. 15, 2020

(65) Prior Publication Data

US 2021/0263849 A1 Aug. 26, 2021

Related U.S. Application Data

(63) Continuation of application No. PCT/CN2020/080318, filed on Mar. 20, 2020.

(30) Foreign Application Priority Data

Feb. 26, 2020 (CN) .......................... 202010118620.0

(51) Int. Cl.
| | |
|---|---|
| *G06F 12/00* | (2006.01) |
| *G06F 13/00* | (2006.01) |
| *G06F 13/28* | (2006.01) |
| *G06F 12/0802* | (2016.01) |
| *G06F 9/30* | (2018.01) |
| *G06N 3/02* | (2006.01) |
| *G06F 12/0893* | (2016.01) |

(52) U.S. Cl.
CPC ...... *G06F 12/0802* (2013.01); *G06F 9/30134* (2013.01); *G06N 3/02* (2013.01); *G06F 12/0893* (2013.01); *G06F 2212/50* (2013.01); *G06F 2212/608* (2013.01)

(58) Field of Classification Search
CPC ..... G06F 3/02; G06F 12/0802; G06F 12/0893
USPC ......................................................... 711/118
See application file for complete search history.

(56) References Cited

U.S. PATENT DOCUMENTS

| | | | |
|---|---|---|---|
| 2019/0205735 A1 | 7/2019 | Smelyanskiy et al. | |
| 2019/0311242 A1* | 10/2019 | Chen | ........................ G06F 17/16 |
| 2020/0074288 A1* | 3/2020 | Zhang | .................... G06N 3/063 |

FOREIGN PATENT DOCUMENTS

| | | |
|---|---|---|
| CN | 108629406 A | 10/2018 |
| CN | 108805266 A | 11/2018 |
| CN | 109214506 A | 1/2019 |
| CN | 110390384 A | 10/2019 |
| CN | 110705687 A | 1/2020 |

* cited by examiner

*Primary Examiner* — Edward J Dudek, Jr.
*Assistant Examiner* — Sidney Li
(74) *Attorney, Agent, or Firm* — Morgan, Lewis & Bockius LLP

(57) ABSTRACT

A data caching circuit and method are provided. The circuit is configured to cache data for a feature map calculated by a neural network, wherein a size of a convolution kernel of the neural network is K*K data, and a window corresponding to the convolution kernel slides at a step of S in the feature map, where K is a positive integer and S is a positive integer, the circuit comprising: a cache comprising K caching units, each caching unit being configured to respectively store a plurality of rows of the feature map, the plurality of rows comprising a corresponding row in every K consecutive rows of the feature map.

20 Claims, 15 Drawing Sheets

DATA CACHING

RELATED APPLICATIONS

The present application is a continuation of PCT Application PCT/CN2020/080318, filed on Mar. 20, 2020, which claims priority to Chinese patent application No. 202010118620.0 filed on Feb. 26, 2020. The content of each of the foregoing applications is hereby incorporated by reference in its entirety for all purposes.

TECHNICAL FIELD

The present disclosure relates to data caching, and in particular to data caching for neural network calculations.

BACKGROUND

The neural network is the core of artificial intelligence technologies. Currently, the neural network has been extensively studied and has drawn much attention, which is applied in the field of artificial intelligence applications including computer vision, speech recognition, robots, autonomous driving, etc.

In practical applications, the neural network usually has a very large number of layers, in some cases up to thousands of layers, thus the amount of input data and intermediate data of the neural network is also extremely huge. Accordingly, data caching for neural networks can limit the speed and energy efficiency of neural network computations.

Methods described in this section are not necessarily methods that have been previously conceived or employed. Unless otherwise indicated expressly, it should not be assumed that any of the methods described in this section are considered to be the prior art just because they are included in this section. Similarly, the problem mentioned in this section should not be considered to be universally recognized in any prior art, unless otherwise indicated expressly.

SUMMARY

According to an aspect of the present disclosure, a data caching circuit is provided. The circuit is configured to cache data of a feature map calculated by a neural network, wherein a size of a convolution kernel of the neural network is K*K data, and a window corresponding to the convolution kernel slides at a step of S in the feature map, where K is a positive integer and S is a positive integer, the circuit comprising: a cache comprising K caching units, each caching unit being configured to respectively store a plurality of rows of the feature map, the plurality of rows comprising a corresponding row in every K rows (e.g., K consecutive rows) of the feature map (e.g., for each successive set of K consecutive rows in the feature map, of a plurality of such sets of K consecutive rows in the feature map, each caching unit of the K caching units stores a single corresponding row of the feature map).

According to another aspect of the present disclosure, a data caching method is provided. The method stores data of a feature map calculated by a neural network in a cache, wherein a size of a convolution kernel of the neural network is K*K data, a window corresponding to the convolution kernel slides at a step of S in the feature map, and the cache comprises K caching units, where K is a positive integer and S is a positive integer, the method comprising: storing a plurality of rows of the feature map in each caching unit, the plurality of rows comprising a corresponding row in every K rows (e.g., K consecutive rows) of the feature map (e.g., storing, for each successive set of K consecutive rows in the feature map, of a plurality of such sets of K consecutive rows in the feature map, a single corresponding row of the feature map in each caching unit of the K caching units).

BRIEF DESCRIPTION OF THE DRAWINGS

The accompanying drawings exemplarily show embodiments and constitute a part of the specification for interpreting exemplary implementations of the embodiments, together with the description in the specification. The embodiments shown are merely for illustrative purposes and do not limit the scope of the claims. Throughout the drawings, the same reference signs refer to similar but not necessarily identical elements.

DETAILED DESCRIPTION OF EMBODIMENTS

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the element, and in some cases, based on contextual descriptions, they may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

The neural network used in practical applications may be a deep neural network (DNN). The deep neural network comprises an input layer, several hidden layers (intermediate layers), and an output layer. The input layer receives input data (for example, pixel data of an image, amplitude data of audio, etc.), performs preprocessing (for example, de-meaning, normalization, principal component analysis (PCA) dimension reduction, etc.) on the input data, and transmits the preprocessed data to a hidden layer. Each of the several hidden layers receives data from the previous layer, performs calculations on the received data, and then transmits the calculated data to the next layer, wherein a hidden layer may be, for example, a convolutional layer or a pooling layer. The output layer receives data from the last hidden layer, performs calculation on the received data, and then outputs a calculated result, wherein the output layer may be, for example, a fully connected layer. A convolutional neural network (CNN) is a deep neural network in which the hidden layers comprise at least one convolutional layer.

Figure 1:
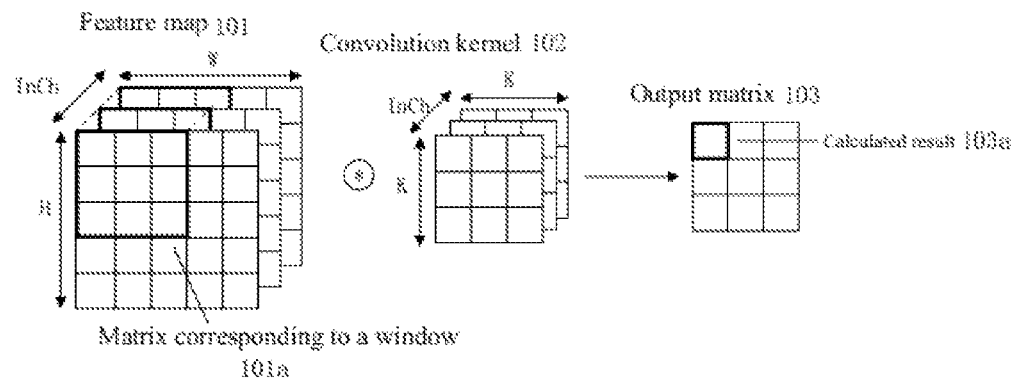
FIG. 1 is a schematic diagram showing calculation at a convolutional layer in a convolutional neural network, in accordance with some embodiments, such as to an exemplary embodiment.

FIG. 1 is a schematic diagram showing calculations at a convolutional layer in a convolutional neural network, in accordance with some embodiments. As shown in FIG. 1, a convolution calculation (represented by the asterisk symbol in FIG. 1) is performed between a feature map 101 and a convolution kernel 102 to obtain an output matrix 103.

According to some embodiments, the feature map 101 is a three-dimensional matrix with a height of H, a width of W, and a number of channels of InCh, and the three-dimensional matrix is constituted by InCh layers with a height of H and a width of W. H, W and InCh are positive integers, respectively, and H and W may be the same or may be different. For example, the feature map in FIG. 1 is a three-dimensional matrix with a height of 5, a width of 5, and a number of channels of 3. However, it should be understood that FIG. 1 is merely exemplary, and the height, width, and number of channels of the feature map are not limited thereto. According to some embodiments, the feature map is data input to the convolutional layer by an input layer or a previous hidden layer.

For ease of description, each group of data in the width direction of the three-dimensional matrix is referred to as a row of the three-dimensional matrix, and addresses in the width direction of the three-dimensional matrix are referred to as column addresses; and each group of data in the height direction of the three-dimensional matrix is referred to as a column of the three-dimensional matrix, and addresses in the height direction of the three-dimensional matrix are referred to as row addresses. However, it should be understood that, alternatively, each group of data in the height direction of the three-dimensional matrix may be referred to as a row of the three-dimensional matrix, and each group of data in the width direction of the three-dimensional matrix may be referred to as a column of the three-dimensional matrix.

For ease of description, it is specified that the row address and the column address in the three-dimensional matrix start from the address "0", a row with a row address of i is the $i^{th}$ row, and a column with a column address of j is the $i^{th}$ column. The two-dimensional address in the three-dimensional matrix is represented as (row address, column address), for example, the two-dimensional address of data with a row address of i and a column address of j in the three-dimensional matrix is (i, j).

According to some embodiments, the convolution kernel 102 is a three-dimensional matrix with a height of K, a width of K, and a number of channels of InCh, wherein in order to perform a convolution calculation, the number of channels of the convolution kernel 102 should be the same as the number of channels of the feature map 101. For example, the convolution kernel in FIG. 1 is a three-dimensional matrix with a height of 3, a width of 3, and a number of channels of 3. However, it should be understood that FIG. 1 is merely exemplary, and the height, width, and number of channels of the convolution kernel are not limited thereto. In addition, although the example in FIG. 1 shows only one convolution kernel, it should be understood that FIG. 1 is merely exemplary, and the number of convolution kernels in the convolutional neural network is not limited thereto.

For ease of description, (height×width) is used in the present disclosure to describe the size of the feature map and the size of the convolution kernel, for example, the size of the feature map in FIG. 1 is 5×5 data and the size of the convolution kernel is 3×3 data.

A convolution calculation is performed between the feature map 101 and the convolution kernel 102 to obtain an output matrix 103, wherein the convolution calculation is represented by a symbol ⊙ in FIG. 1. In particular, a window corresponding to the convolution kernel slides at a step of S in the feature map in the height or width direction, where the step S is a positive integer, and S is less than K. In some embodiments, S may be 1. In some other embodiments, S may be greater than 1. At each position in the feature map 101 to which the window slides, a convolution calculation is performed between the three-dimensional matrix of data in the feature map 101 corresponding to the window and the convolution kernel 102 so as to obtain various elements in the output matrix 103. Performing a convolution calculation between a matrix corresponding to the window, for example, a matrix 101a corresponding to the window and the convolution kernel 102 is as follows: elements of the matrix 101a corresponding to the window are multiplied by elements of the convolution kernel 102 that are at corresponding positions, and then all the products are added to obtain a calculated result 103a in the output matrix 103.

Figure 2A:
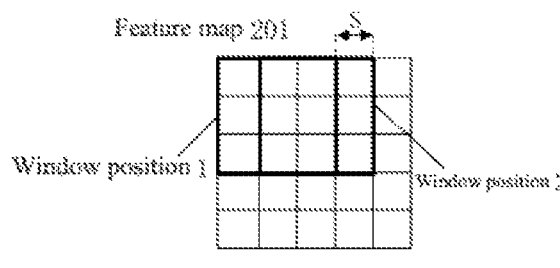
FIGS. 2a and 2b are schematic diagrams showing the sliding of a window corresponding to a convolution kernel in a feature map, in accordance with some embodiments, such as an exemplary embodiment.

According to some embodiments, K rows of the feature map are selected and the window slides in the row direction or the width direction within the K rows. FIG. 2a shows a schematic diagram of the window sliding within the K rows. For ease of description, only a two-dimensional plane corresponding to the height and the width is drawn in FIG. 2a, but it should be understood that the matrix corresponding to the window is a three-dimensional matrix constituted by data at the position of window in all layers of the feature map. As shown in FIG. 2a, after a convolution calculation is performed between a matrix corresponding to the window at a window position 1 and the convolution kernel, the window slides at a step of S (in this example, S=1) to a window position 2 in the width direction, and then a convolution calculation is performed between a matrix corresponding to the window at the window position 2 and the convolution kernel. The last (K-S) columns of the matrix corresponding to the window at the window position 1 overlap with the first (K-S) columns of the matrix corresponding to the window at the window position 2.

Figure 2B:
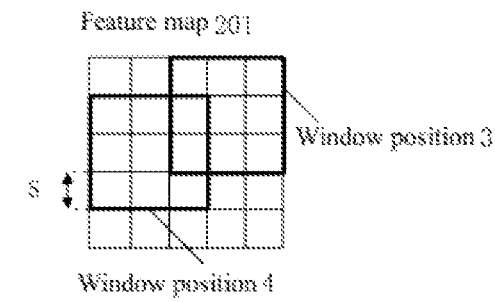

According to some other embodiments, after the window has slid to the end of the K rows, the sliding of the window in the current K rows is ended and a sliding in reselected K rows (i.e., a next selected set of K rows) is started. In the present disclosure, "the window has slid to the end of the K rows" means that if the window continues to slide at the step of S, the window will go beyond the range of the feature map. In some cases, when the window has slid such that the last column of the matrix corresponding to the window overlaps with the last column of the feature map, the window has slid to the end of the K rows. In some other cases, although the last column of the matrix corresponding to the window has not yet overlapped with the last column of the feature map, the window has also slid to the end of the K rows when the difference between the column address of the last column of the feature map and the column address of the last column of the matrix corresponding to the window is less than S, in that if the window were to continue to slide at the step of S, the window would go beyond the range of the feature map. "After the window has slid to the end of the K rows" means that the sliding operation of the window to the end of the K rows and a corresponding data output operation have been completed. FIG. 2b shows a schematic diagram of the window sliding across rows. Similar to FIG. 2a, FIG. 2b is also a two-dimensional plane corresponding to the height and the width. As shown in FIG. 2b, after the window has slid to the end of the K rows (a window position 3, corresponding to the last K columns in the current K rows), the sliding in the current K rows is ended, and the last (K-S) rows in the current K rows and S rows after the current K rows are selected as a next set of K rows, herein called new K rows. The window moves from the original window position 3 to a window position 4 corresponding to the first K columns in the new K rows, and starts to slide in the new K rows.

Although the examples in FIGS. 2a and 2b show that the window slides at a step of 1, it should be understood that FIG. 2 is merely exemplary, and the step of window sliding in the convolutional neural network is not limited thereto.

Figure 3:
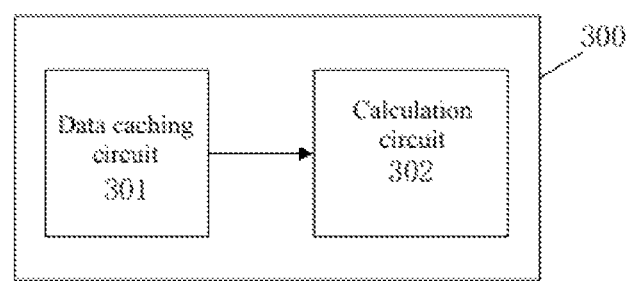
FIG. 3 shows a structural block diagram of a system for neural network calculation, in accordance with some embodiments, such as an exemplary embodiment.

FIG. 3 shows a structural block diagram of a system 300 (e.g., a computer system, or an information processing device or system) for neural network calculation, in accordance with some embodiments, such as an exemplary embodiment. As shown in FIG. 3, the calculation system 300 comprises a data caching circuit 301 and a calculation circuit 302. The data caching circuit 301 caches input data for neural network calculation, and outputs the cached data to the calculation circuit 302.

According to some embodiments, the data caching circuit 301 caches data for the feature map calculated by the neural network, and the calculation circuit 302 loads data of the convolution kernel of the neural network. According to some embodiments, the data caching circuit 301 sequentially outputs data of a matrix corresponding to the window (e.g., at a current window position in the feature map 201) to the calculation circuit 302, and the calculation circuit 302 performs calculation between the received matrix corresponding to the window (i.e., data received, from the data caching circuit 301, corresponding to a current window position in the feature map 201) and the loaded convolution kernel so as to obtain various calculated results in the output matrix 103.

Since the data caching circuit 301 caches all data of the feature map, it is desirable to reduce storage space occupied by the feature map. The present disclosure reduces the storage space occupied by the feature map by simplifying cache addressing logic in the data caching circuit 301.

Figure 4:
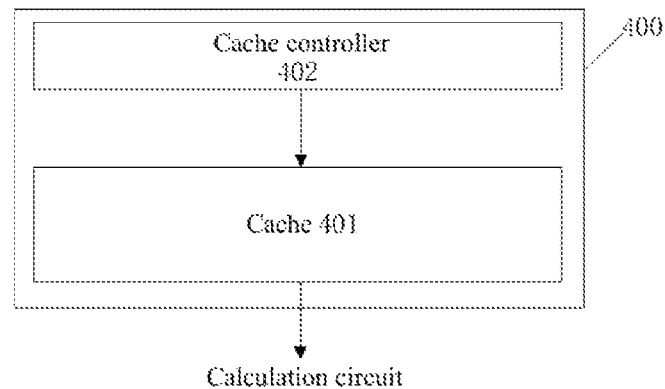
FIG. 4 shows a structural block diagram of a data caching circuit, in accordance with some embodiments, such as a first exemplary embodiment of the present disclosure.

FIG. 4 shows a structural block diagram of a data caching circuit 400, in accordance with some embodiments, such as a first exemplary embodiment of the present disclosure. As shown in FIG. 4, the data caching circuit 400 comprises a cache 401 and a cache controller 402.

According to some embodiments, matrices corresponding to windows at all window positions in the feature map are respectively stored in the cache 401, and the cache controller 402 controls the cache 401 to output a matrix (of data) corresponding to a current window. For example, both the matrix corresponding to the window at the window position 1 in FIG. 2a and the matrix corresponding to the window at the window position 2 are stored in the cache 401. When the window is at the window position 1, the cache 401 outputs a matrix corresponding to the window at the window position 1; and when the window is at the window position 2, the cache 401 outputs a matrix corresponding to the window at the window position 2. Since the matrix corresponding to the window at the window position 1 partially overlaps with the matrix corresponding to the window at the window position 2, the overlapped portion is repeatedly stored in the cache 401. Therefore, although the addressing logic of the cache 401 is relatively simple in this case, a large amount of data in the feature map is repeatedly stored, thereby causing a waste of storage space.

According to some embodiments, the three-dimensional matrix corresponding to the feature map is stored in the cache 401, and the cache controller 402 controls the cache 401 to sequentially output data corresponding to each two-dimensional address at a current window position. For example, when the window is at the window position 1 in FIG. 2a, data with addresses (1, 1), (1, 2), (1, 3), (2, 1), (2, 2), (2, 3), (3, 1), (3, 2), (3, 3) in the feature map are sequentially output. In this case, no data is repeatedly stored in the cache 401. However, since data in the matrix corresponding to the window is stored in the cache 401 out of order, the addressing logic of the cache 401 is relatively complex in this case.

Figure 5:
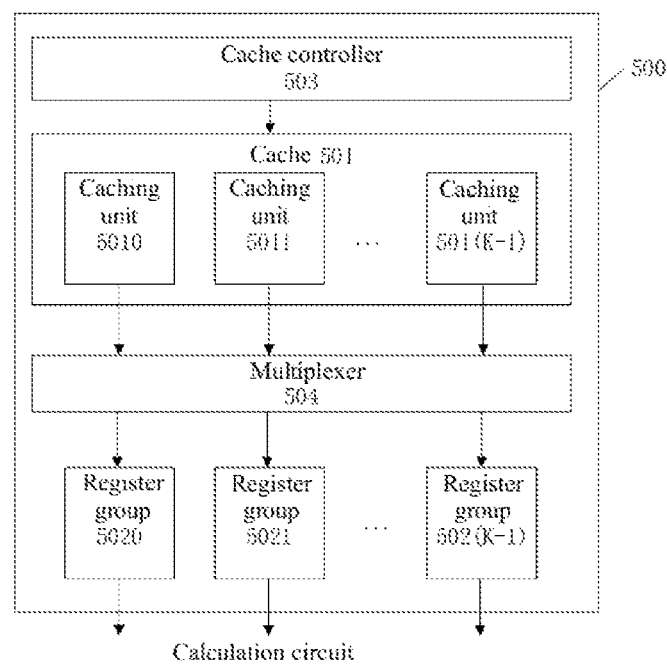
FIG. 5 shows a structural block diagram of a data caching circuit, in accordance with some embodiments, such as a second exemplary embodiment of the present disclosure.

FIG. 5 shows a structural block diagram of a data caching circuit 500, in accordance with some embodiments, such as a second exemplary embodiment of the present disclosure.

Circuit 500 is configured to cache data for a feature map calculated by a neural network, wherein a size of a convolution kernel of the neural network is K×K data, and a window corresponding to the convolution kernel slides at a step of S in the feature map, where K is a positive integer and S is a positive integer. The circuit 500 comprises a cache 501, the cache 501 comprising K caching units 5010 to 501 (K−1), wherein each caching unit is configured to respectively store a plurality of rows of the feature map, the plurality of rows comprising a corresponding row in every K rows of the feature map (e.g., for each successive set of K consecutive rows in the feature map, of a plurality of such sets of K consecutive rows in the feature map, each caching unit of the K caching units stores a single corresponding row). Here, the term "every K rows of the feature map" means every set of K consecutive rows of the feature map, for example, consecutive rows from the $0^{th}$ row to the $(K-1)^{th}$ row of the feature map, consecutive rows from the $1^{st}$ row to the $K^{th}$ row of the feature map, etc.

As shown in FIG. 2a, when the window corresponding to the convolution kernel slides in the width direction in every K rows of the feature map, the matrix corresponding to the window is a set of K consecutive columns in every K rows of the feature map. In the present disclosure, since each caching unit stores a corresponding row in every K rows of the feature map, every K rows of the feature map are respectively stored in K different caching units 5010 to 501 (K−1). Therefore, provided that only column addresses are provided to the caching units 5010 to 501 (K−1), the caching units 5010 to 501 (K−1) can output data in one column in every K rows without addressing all data in that column one by one, thereby simplifying the addressing logic.

According to some embodiments, each row of the feature map is each group of data in the width direction in the feature map and each column of the feature map is each group of data in the height direction in the feature map. According to some other embodiments, each row of the feature map is each group of data in the height direction in the feature map and each column of the feature map is each group of data in the width direction in the feature map.

According to an embodiment of the present disclosure, for each row of the feature map, a remainder obtained by dividing a row address (e.g., a row address of a respective row of the feature map) by K corresponds to the ordinal number of a caching unit that stores said row (e.g., the respective row) of the feature map.

Figure 6:
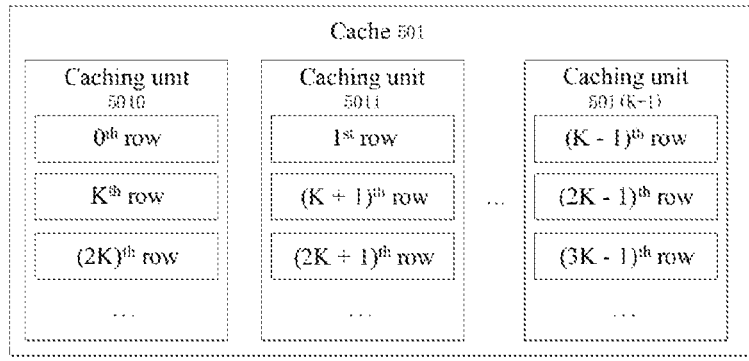
FIG. 6 is a schematic diagram showing a cache, in accordance with some embodiments, such as the second exemplary embodiment of the present disclosure.

FIG. 6 shows data stored by the caching units 5010 to 501 (K−1) of the cache 501 according to some embodiments. As shown in FIG. 6, for the $0^{th}$ row of the feature map, since a remainder obtained by dividing 0 by K is 0, the $0^{th}$ row of the feature map is stored in the caching unit 5010; and for the $K^{th}$ row of the feature map, since a remainder obtained by dividing K by K is also 0, the $K^{th}$ row of the feature map is stored in the caching unit 5010. Similarly, the $1^{st}$ row and the $(K+1)^{th}$ row of the feature map are stored in the caching unit 5011, and the $(K−1)^{th}$ row and the $(2K−1)^{th}$ row of the feature map are stored in the caching unit 501 (K−1).

As described with reference to FIG. 2a, while a system, such as system 300, is performing calculations, such as convolution calculations for a convolutional layer in a convolutional neural network, the window corresponding to the convolution kernel slides in the width direction in K consecutive rows of the feature map, herein called "the consecutive K rows." Assuming that the row address of the first row in the consecutive K rows is i, the row addresses of the consecutive K rows are i, i+1, . . . , and i+(K−1). Therefore, remainders obtained by dividing the row addresses of the consecutive K rows by K may be sequentially, for example, 0, 1, . . . , and (K−1) respectively, or may be sequentially, for example, q, 1+q, (K−1), 0, (q−1) respectively, where q is a positive integer less than K and is a remainder obtained by dividing i by K. Since a remainder obtained by dividing a row address by K corresponds to the ordinal number of a caching unit that stores said row, the consecutive K rows of the feature map are respectively stored in K caching units.

According to some embodiments, the capacity of the caching units is designed according to the size of the feature map. The feature map with a height of H, a width of W, and a number of channels of InCh has H rows, each row including W data in the feature map, namely, (W*InCh) data. If it is specified that an integer quotient obtained by dividing H by K is M, the caching unit 5010 stores M rows, namely, (M*W*InCh) data in the feature map. The capacity of the caching units should be designed to be sufficient to store (M*W*InCh) data.

According to an embodiment of the present disclosure, the circuit 500 further comprises K register groups 5020 to 502 (K−1), wherein each of the register groups is configured to receive data from a corresponding caching unit, and output stored data to a calculation circuit.

According to some embodiments, the register groups 5020 to 502 (K−1) output data of a matrix corresponding to a current window to the calculation circuit, wherein each register group outputs data of a corresponding row of the matrix corresponding to the window. In particular, the register group 5020 outputs the $0^{th}$ row of data in the matrix corresponding to the window, and the register group 5021 outputs the $1^{st}$ row of data in the matrix corresponding to the window, . . . , and the register group 502 (K−1) outputs the $(K−1)^{th}$ row of data in the matrix corresponding to the window.

According to an embodiment of the present disclosure, the circuit 500 further comprises a cache controller 503, the cache controller 503 being configured to: select a set of K consecutive rows of the feature map, herein called the selected K rows, the consecutive K rows, or simply "the K rows;" control the cache 501 to output data in a matrix corresponding to the window; cause the window to slide in the row direction in the selected K rows; and control, after the window slides, the cache 501 to output the last S columns in the matrix corresponding to the window.

According to some embodiments, when the window starts to slide in the selected K rows, the window is at the $0^{th}$ column to the $(K−1)^{th}$ column in the K rows, and the cache controller 503 controls the cache 501 to output data in the $0^{th}$ column to the $(K−1)^{th}$ column in the K rows. According to some other embodiments, each time after the window slides, as described above with reference to FIG. 2a, the last (K−S) columns of a matrix corresponding to the window before the sliding overlap with the first (K−S) columns of a matrix corresponding to the window after sliding, and therefore, the cache controller 503 only needs to control the cache 501 to further output data in the last non-overlapped S columns of the matrix corresponding to the window.

According to an embodiment of the present disclosure, each of the K rows corresponds to a corresponding row in a corresponding caching unit of the K caching units, and the cache controller 503 is further configured to: control, for each caching unit, the caching unit to output, column by column based on column addresses, data in the corresponding row. As described above, the consecutive K rows of the feature map are respectively stored in the K caching units and therefore, for each caching unit, the cache controller 503 respectively selects one row stored therein.

According to some embodiments, the cache controller 503 controls all the caching units 5010 to 501 (K−1) to simultaneously output data with the same column address (e.g., data is simultaneously output while a system, such as system 300, that includes the cache controller 503 and caching units, is performing calculations, such as convolution calculations for a convolutional layer in a convolutional neural network). Since each caching unit outputs one of the selected K rows, when all the caching units 5010 to 501 (K−1) simultaneously output data with the same column address, the cache 501 outputs one column in the selected K rows.

When the window slides in the selected K rows, the cache 501 outputs only data in the last non-overlapped S columns of matrices corresponding to the windows before and after the sliding, and therefore, each time after the window slides, each caching unit continues to output, from the current column address, data in the last S columns of the matrix corresponding to the window without returning to the $1^{st}$ column of the matrix corresponding to the window. Thus, when the window slides in the selected K rows, the caching units output, column by column based on column addresses, data in the selected rows without returning to the address before the current column address each time after the window slides.

For the cache, when data stored therein is read out of order, the addressing logic is complex and the speed of data reading is relatively slow, whereas when the data stored therein is sequentially output, the addressing logic is simple and the data reading is speeded up. Since the caching units sequentially output data in the selected rows, the addressing logic is simplified and the speed of data reading is improved.

According to some embodiments, as described above with reference to FIG. 2$b$, while performing a convolution computation or operation, after the window slides to the end of the currently selected K rows of the feature map, the sliding of the window in the currently selected K rows is ended and a sliding in a next set of K rows (sometimes herein called the reselected K rows) of the feature map is started, wherein the last (K-S) rows in the original K rows overlap with the first (K-S) rows in the reselected K rows.

According to an embodiment of the present disclosure, the cache controller 503 is further configured to: select, starting from the $1^{st}$ row address of the feature map, a respective set of K consecutive rows; reselect, after the window slides to the end of the respective set of K rows, rows (e.g., K consecutive rows) from the $(S+1)^{th}$ row to the $K^{th}$ row in the respective set of K consecutive rows and S rows after the respective set of K consecutive rows; and control the cache to output, from the $1^{st}$ column address, the reselected K consecutive rows of the feature map.

According to an embodiment of the present disclosure, the cache controller 503 is further configured to: select, after the window slides to the end of the K rows, for each of caching units that output rows from the $1^{st}$ row to the $S^{th}$ row in the K rows, a next row stored therein, and still select, for caching units that output rows from the $(S+1)^{th}$ row to the $K^{th}$ row in the K rows, the currently selected rows; and control each caching unit to output, from the $1^{st}$ column address in the selected rows, the selected rows.

For example, when the window slides in the $0^{th}$ row to the $(K-1)^{th}$ row of the feature map, the caching units 5010 to 501 (S-1) output rows from the $1^{st}$ row to the $S^{th}$ row in the K rows, namely, from the $0^{th}$ row to the $(S-1)^{th}$ row of the feature map, and the caching units 501S to 501 (K-1) output rows from the $(S+1)^{th}$ row to the $K^{th}$ row in the K rows, namely, from the $S^{th}$ row to the $(K-1)^{th}$ row of the feature map. When the window slides to the end of the K rows, for the caching unit 5010, the next row stored therein, namely, the $K^{th}$ row of the feature map, is selected, similarly, the $(K+1)^{th}$ row of the feature map is selected for the caching unit 5011, ..., and the $(K+S-1)^{th}$ row of the feature map is selected for the caching unit 501(S-1).

According to an embodiment of the present disclosure, the circuit 500 further comprises a multiplexer 504, the multiplexer 504 being configured to transmit data from each caching unit to a corresponding register group. As described above, each register group receives data in a corresponding row in a matrix corresponding to a window and outputs the data to a calculation circuit. However, when the window slides across rows, the selected rows of each caching unit correspond to different rows in the matrix corresponding to the window, and therefore, data from the caching unit should be transmitted to different register groups.

According to some embodiments, as the window slides across rows of the feature map, the multiplexer 504 correspondingly changes the correlation between the caching units that output data and the register groups that receive the data. For example, when the window slides in the $0^{th}$ row to the $(K-1)^{th}$ row of the feature map, the caching unit 5010 outputs the $0^{th}$ row of the feature map, namely, the $0^{th}$ row of the matrix corresponding to the window, in which case the multiplexer 504 transmits the data from the caching unit 5010 to the register group 5020; and when the window slides in the $S^{th}$ row to the $(K+S-1)^{th}$ row of the feature map, the caching unit 5010 outputs the $K^{th}$ row of the feature map, namely, the $(K-S)^{th}$ row of the matrix corresponding to the window, in which case the multiplexer 504 transmits the data from the caching unit 5010 to the register group 502(K-S).

According to an embodiment of the present disclosure, the cache 501 comprises a random access memory (RAM).

Figure 7A:
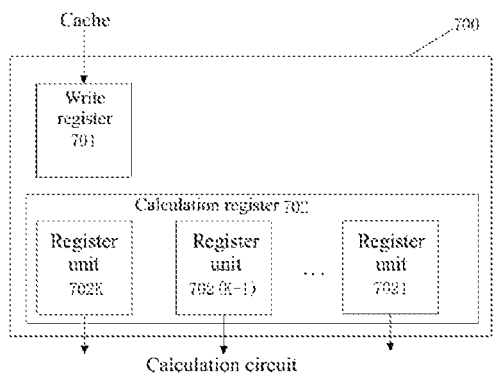
FIGS. 7a and 7b are schematic diagrams showing a data reading mode and a data shifting mode of a register group, in accordance with some embodiments, such as the second exemplary embodiment of the present disclosure.
Figure 7B:
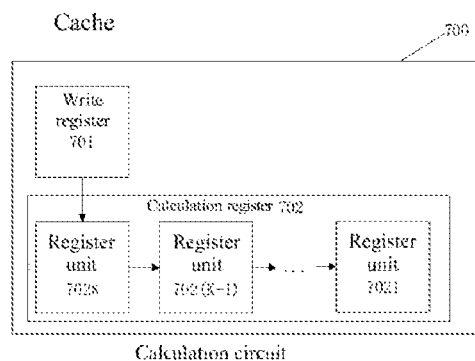

FIGS. 7$a$ and 7$b$ are schematic diagrams showing a data reading mode and a data shifting mode of a register group, in accordance with some embodiments, such as the second exemplary embodiment of the present disclosure. According to an some embodiments of the present disclosure, each register group 700 comprises a write register 701 configured to receive data from a corresponding caching unit; and a calculation register 702 configured to receive data from the write register 701 and output registered data to the calculation circuit.

According to an embodiment of the present disclosure, when the register group 700 is in a data reading mode, as shown in FIG. 7$a$, the write register 701 receives data from a corresponding caching unit, and the calculation register 702 outputs registered data to the calculation circuit; and when the register group 700 is in a data shifting mode, as shown in FIG. 7$b$, the write register 701 shifts registered data to the calculation register 702.

According to some embodiments, the register group 700 is alternately in the data reading mode and the data shifting mode. When the register group 700 is in the data reading mode, the calculation register 702 outputs the corresponding row of the matrix corresponding to the current window to the calculation circuit, in which case the data registered in the calculation register 702 remains unchanged; and the write register 701 receives the non-overlapped portion in the corresponding rows of the matrices corresponding to the windows before and after sliding, namely, the last S columns in the corresponding rows of the matrix corresponding to the window after the sliding. When the register group 700 is in the data shifting mode, the write register 701 shifts the data received in the data reading mode to the calculation register 702, and data in the calculation register 702 is updated to be data of the corresponding row of the matrix corresponding to the window after the sliding. Since the write register 701 receives data from the caching unit while the calculation register 702 outputs the matrix corresponding to the current window to the calculation circuit, and only the non-overlapped portion in the corresponding rows of the matrices corresponding to the windows before and after sliding needs to be received, the delay in accessing the cache is reduced.

According to an embodiment of the present disclosure, the calculation register 702 comprises: K register units 7021 to 702K, the last register unit 702K of the K register units being configured to receive data from the write register 701. In response to receiving the data from the write register 701, each of the last (K-1) units 7022 to 702K of the K register units shifts data registered therein to a previous register unit.

According to some embodiments, when the window starts to slide within the K rows of the feature map, the write register 701 sequentially shifts, based on column addresses, the data in the corresponding row in the matrix corresponding to the window to the register units 7021 to 702K. In particular, at the first moment, the write register 701 shifts the data in the $0^{th}$ column in the corresponding row to the register unit 702K; at the second moment, the write register 701 shifts the data in the $1^{st}$ column in the corresponding row to the register unit 702K, and the register unit 702K shifts the data in the $0^{th}$ column in the corresponding row to the register unit 702 (K−1); . . . ; and at the $K^{th}$ moment, the write register 701 shifts the data in the $(K−1)^{th}$ column in the corresponding row to the register unit 702K, and the register units 7022 to 702K also shift data registered therein to the previous register unit, in which case the register unit 7021 registers the $0^{th}$ column in the corresponding row, the register unit 7022 registers the $1^{st}$ column in the corresponding row, . . . , and the register unit 702K registers the $(K−1)^{th}$ column in the corresponding row.

According to some other embodiments, when the window slides within the K rows of the feature map, the write register 701 sequentially shifts, based on column addresses, the data in the last S columns in the corresponding row of the matrix corresponding to the window after the sliding to the register units 702 (K-S+1) to 702K, and shifts data registered in the original register units 702 (K-S+1) to 702K to the register units 7021 to 702 (K-S).

According to an embodiment of the present disclosure, when a row of the feature map that is output by any caching unit changes, the calculation register in each register group is cleared. As described above, as the window slides across rows of the feature map, the S caching units change the output rows, and a row output by each register group also changes. Therefore, when the window starts to slide in the new K rows, data in a row output before the sliding is cleared from the calculation register so as to register data in a row output after the sliding.

According to an embodiment of the present disclosure, each data in the feature map comprises data with the same two-dimensional address on all channels, wherein the two-dimensional address comprises a row address and a column address of each data.

According to an embodiment of the present disclosure, the calculation circuit is a vector-matrix multiplication calculation circuit or a storage and calculation integrated circuit.

FIGS. 8a to 8e are schematic diagrams showing example operations of a data caching circuit when the convolution kernel of a neural network slides within rows, in accordance with some embodiments, such as the second exemplary embodiment of the present disclosure. The size of the feature map is 5×5 data, the size of the convolution kernel is 3×3 data, and the step of window sliding is 1.

As shown in FIGS. 8a to 8e, in this case, the window slides in the $0^{th}$ row to the $2^{nd}$ row of the feature map, and in this case, a caching unit 8010 outputs the $0^{th}$ row of the feature map, a caching unit 8011 outputs the $1^{st}$ row of the feature map, and a caching unit 8012 outputs the $2^{nd}$ row of the feature map. A register group 8020 outputs the $0^{th}$ row of a matrix corresponding to a window, and therefore receives data from the caching unit 8010; a register group 8021 outputs the $1^{th}$ row of the matrix corresponding to the window, and therefore receives data from the caching unit 8011; and a register group 8022 outputs the $2^{nd}$ row of the matrix corresponding to the window, and therefore receives data from the caching unit 8012.

Figure 8A:
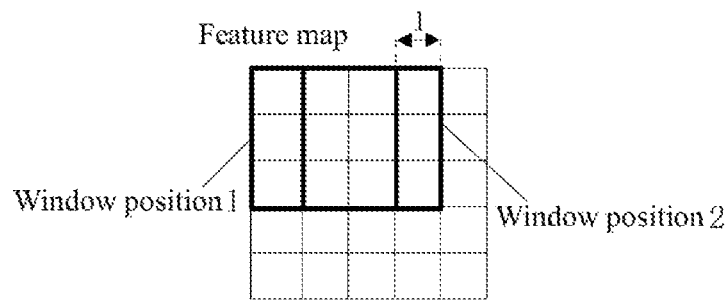
FIGS. 8a to 8e are schematic diagrams showing example operations of a data caching circuit when the convolution kernel of a neural network slides within rows, in accordance with some embodiments, such as the second exemplary embodiment of the present disclosure.
Figure 8A:
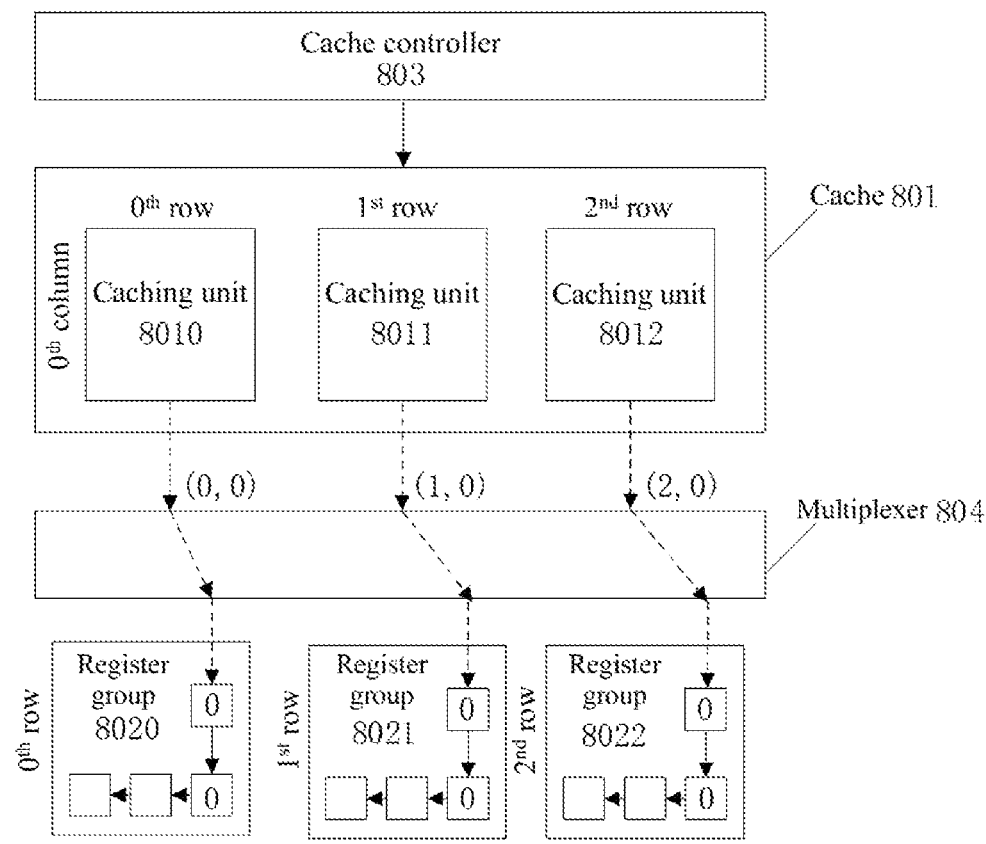
Figure 8B:
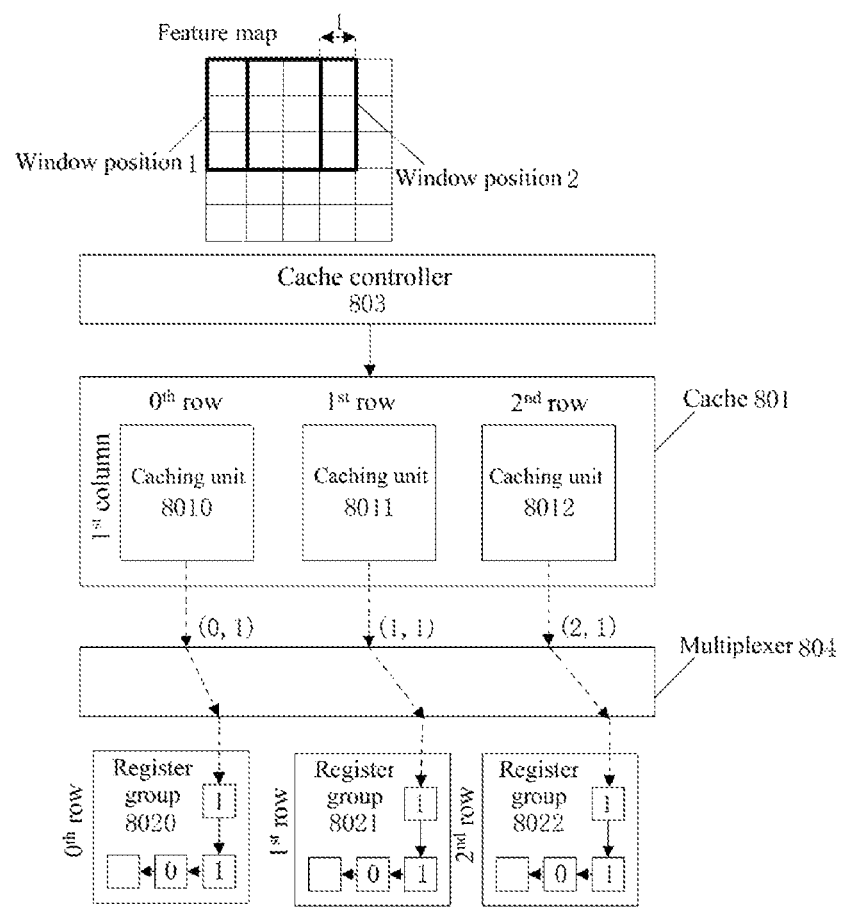
Figure 8C:
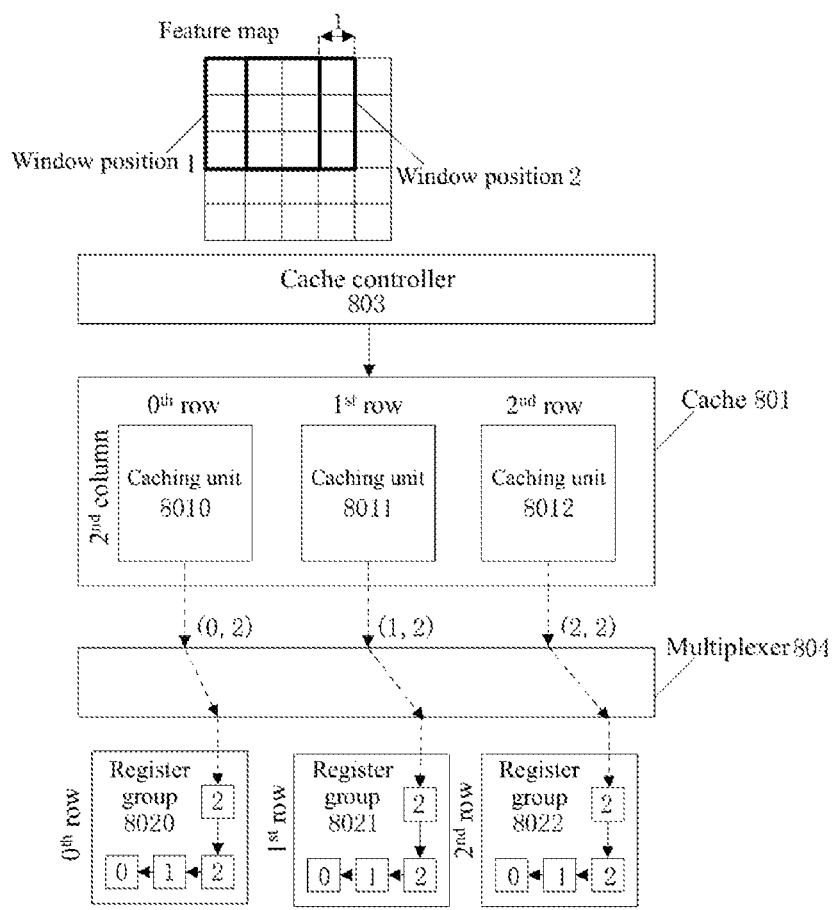

As shown in FIGS. 8a to 8c, when the window starts to slide in the $0^{th}$ row to the $2^{nd}$ row of the feature map, the window is at a window position 1, and the window position 1 corresponds to the $0^{th}$ column to the $2^{nd}$ column in the $0^{th}$ row to the $2^{nd}$ row of the feature map. As shown in FIG. 8a, the register groups 8020 to 8022 are all in the data shifting mode. In each register group, the write register registers data received from a corresponding caching unit in the previous data reading mode, namely, the $0^{th}$ column in the corresponding rows of the feature map. In this case, the write register shifts the $0^{th}$ column in the corresponding row of the feature map that is registered therein to the calculation register. Similarly, in FIG. 8b, in each register group, the write register shifts the $1^{st}$ column in the corresponding row of the feature map that is registered therein to the calculation register, and the calculation register registers the $0^{th}$ column and the $1^{st}$ column in the corresponding row of the feature map; and in FIG. 8c, in each register group, the write register shifts the $2^{nd}$ column in the corresponding row of the feature map that is registered therein to the calculation register, and the calculation register registers the $0^{th}$ column to the $2^{nd}$ column in the corresponding row of the feature map.

Figure 8D:
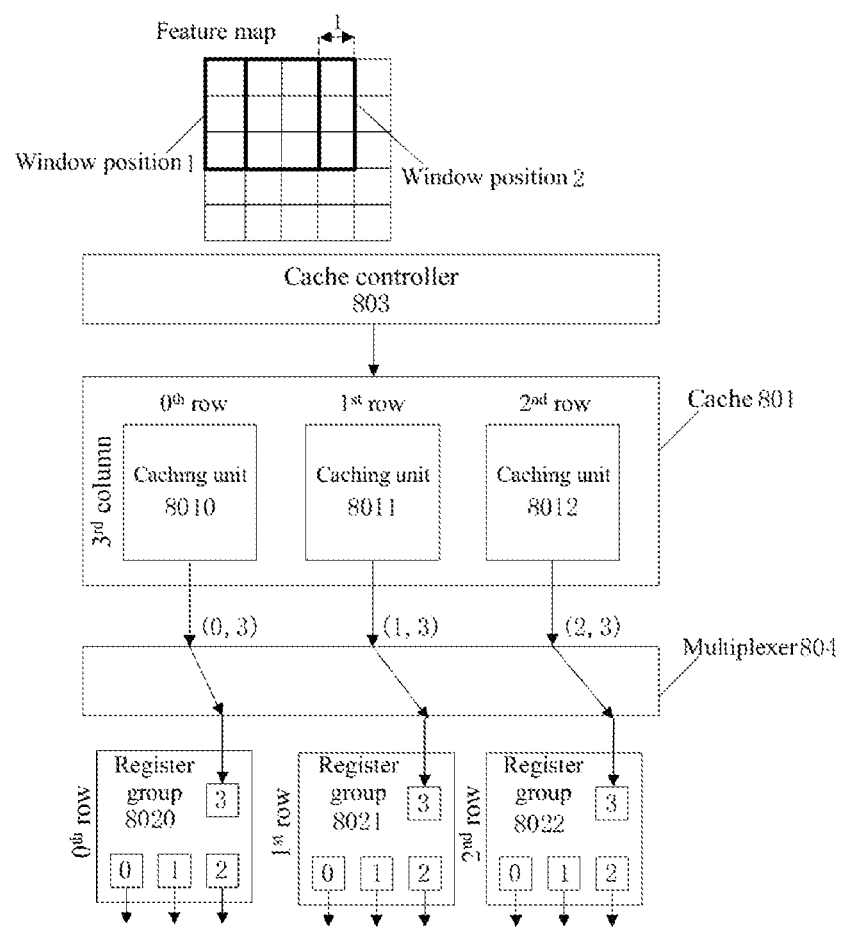

As shown in FIG. 8d, the window has slid from the window position 1 to a window position 2, and the window position 2 corresponds to the $1^{st}$ column to the $3^{rd}$ column in the $0^{th}$ row to the $2^{nd}$ row of the feature map. In this case, the register groups 8020 to 8022 are all in the data reading mode. In each register group, the calculation register outputs the corresponding row of the matrix corresponding to the window at the window position 1, and the write register receives the $3^{rd}$ column of data in the corresponding row of the feature map.

Figure 8E:
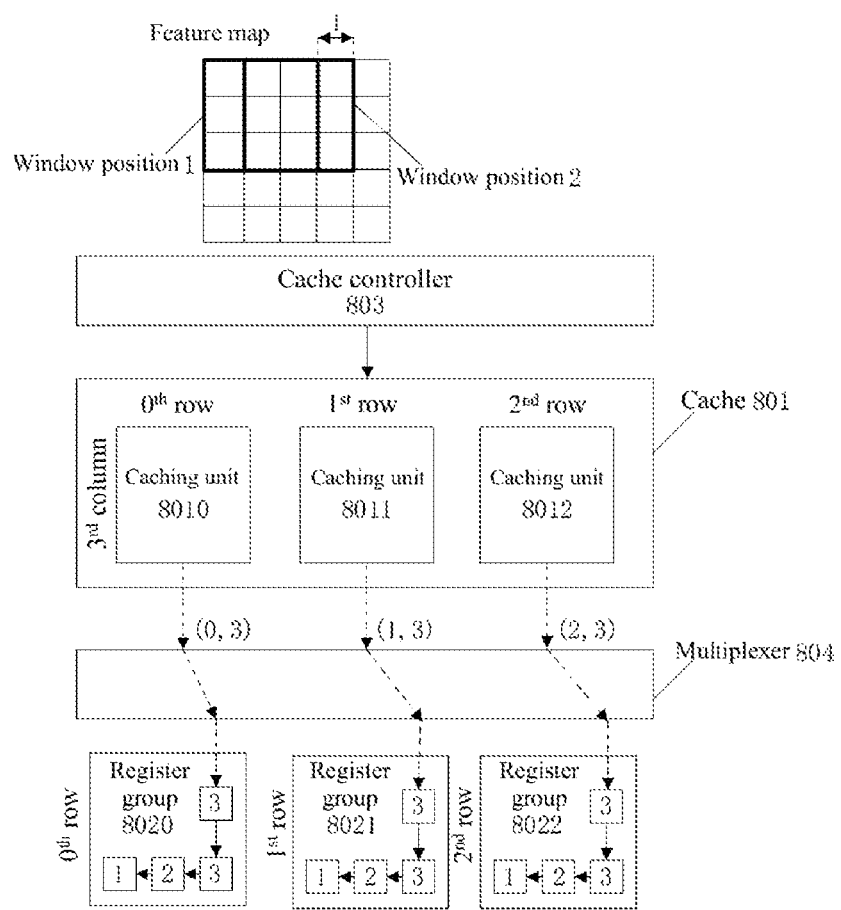

As shown in FIG. 8e, the window is at the window position 2. In this case, the register groups 8020 to 8022 are all in the data shifting mode. In each register group, the write register shifts data in the $3^{rd}$ column in the corresponding row of the feature map to the calculation register, and a register unit in the calculation register also sequentially shifts data registered therein to a previous register unit. After the data shifting, the data registered in the register groups 8020 to 8022 are updated to be the data of the matrix corresponding to the window at the window position 2 after sliding.

FIGS. 9a to 9e are schematic diagrams showing example operations of a data caching circuit when (e.g., a system, such as system 300, is performing calculations, such as convolution calculations for a convolutional layer in a convolutional neural network) the convolution kernel of a neural network slides across rows, in accordance with some embodiments, such as the second exemplary embodiment of the present disclosure.

As shown in FIGS. 9a to 9e, at a window position 3, the sliding of the window in the $0^{th}$ row to the $2^{nd}$ row of the feature map is ended; and at a window position 4, the window starts to slide in the $1^{st}$ row to the $3^{rd}$ row.

Figure 9A:
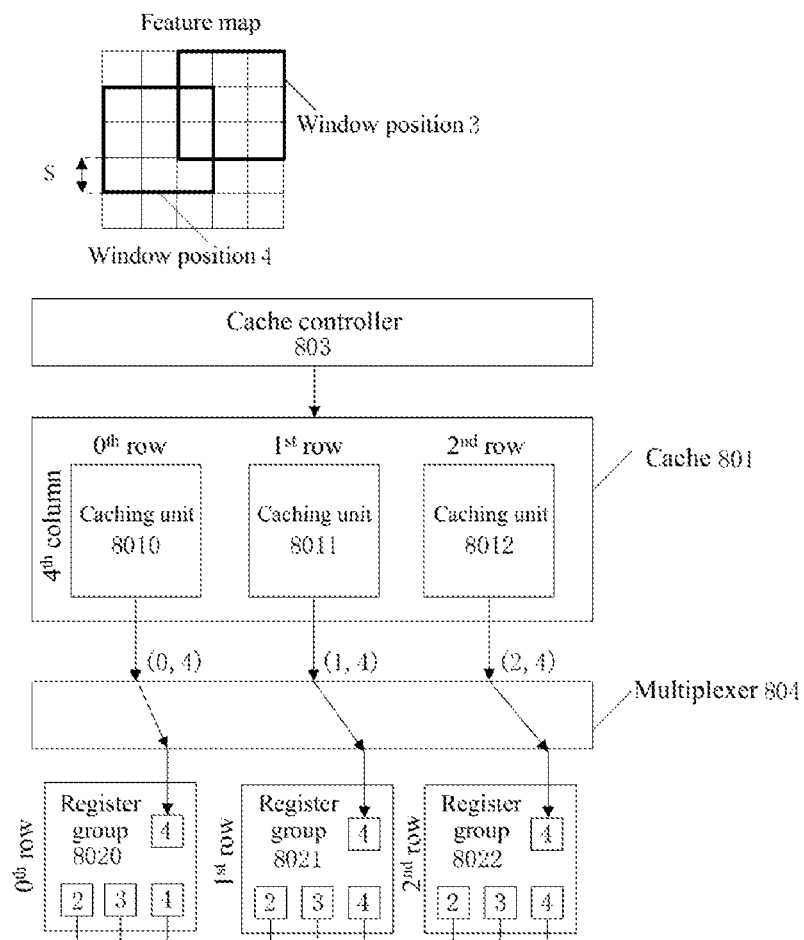
FIGS. 9a to 9e are schematic diagrams showing example operations of a data caching circuit when the convolution kernel of a neural network slides across rows, in accordance with some embodiments, such as the second exemplary embodiment of the present disclosure.

As shown in FIG. 9a, the window is at the window position 3, and the window position 3 corresponds to the $2^{nd}$ column to the $4^{th}$ column in the $0^{th}$ row to the $2^{nd}$ row of the feature map. In this case, as described with reference to FIGS. 8a to 8c, the register group 8020 receives data from the caching unit 8010; the register group 8021 receives data from the caching unit 8011; and the register group 8022 receives data from the caching unit 8012.

Figure 9B:
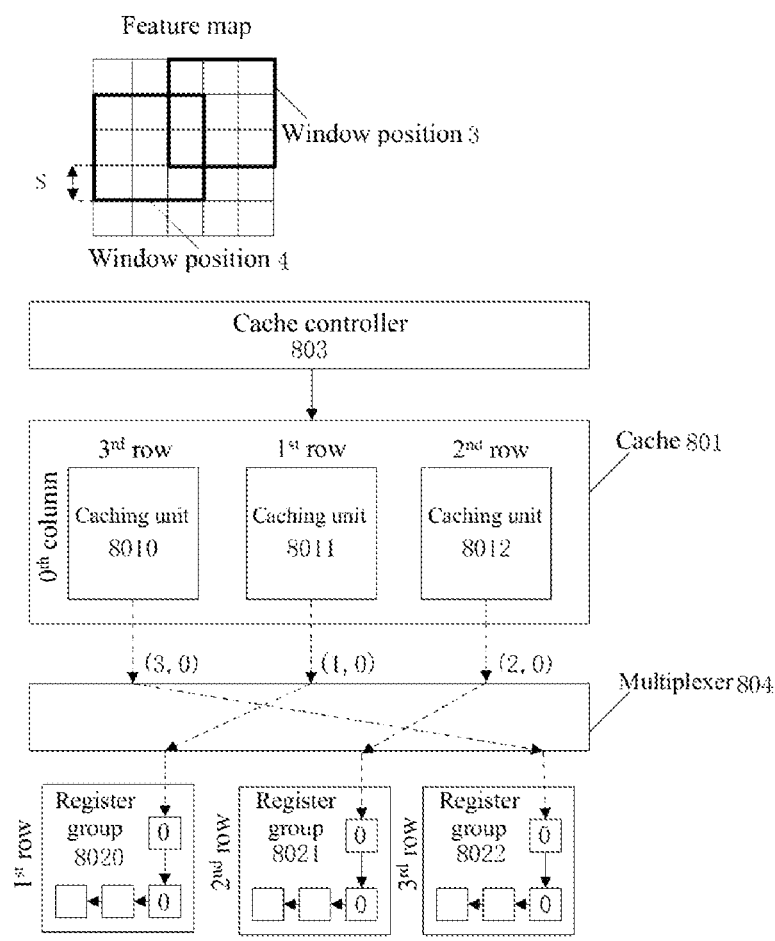

As shown in FIGS. 9b to 9e, the window has slid from the window position 3 to the window position 4. The window position 4 corresponds to the $0^{th}$ column to the 2nd column in the $1^{st}$ row to the $3^{rd}$ row of the feature map. The caching unit 8010 outputs the $3^{rd}$ row of the feature map, the caching unit 8011 outputs the $1^{st}$ row of the feature map, and the caching unit 8012 outputs the 2nd row of the feature map. A register group 8020 outputs the $0^{th}$ row of a matrix corresponding to a window, and therefore receives data from the caching unit 8011; a register group 8021 outputs the $1^{th}$ row of the matrix corresponding to the window, and therefore receives data from the caching unit 8012; and a register group 8022 outputs the 2nd row of the matrix corresponding to the window, and therefore receives data from the caching unit 8010. In FIG. 9b, since the row output by the caching unit 8010 changes from the $0^{th}$ row of the feature map to the $3^{rd}$ row of the feature map, data in the $0^{th}$ row of the feature map that is registered in the calculation registers in the register groups 8020 to 8022 is cleared.

Figure 9C:
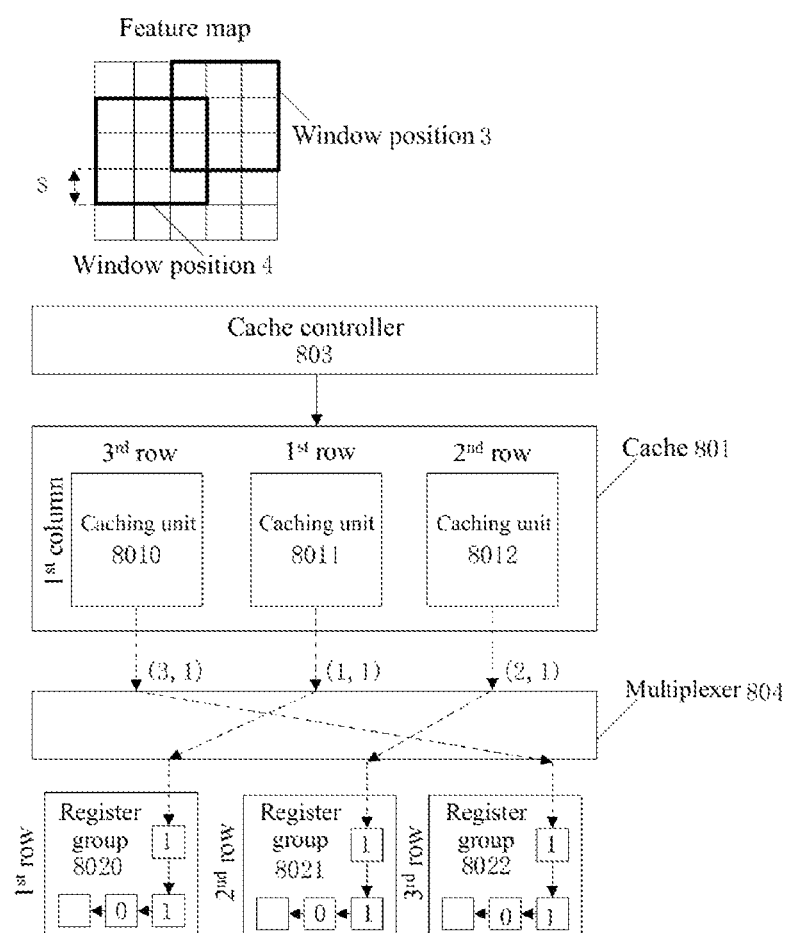
Figure 9D:
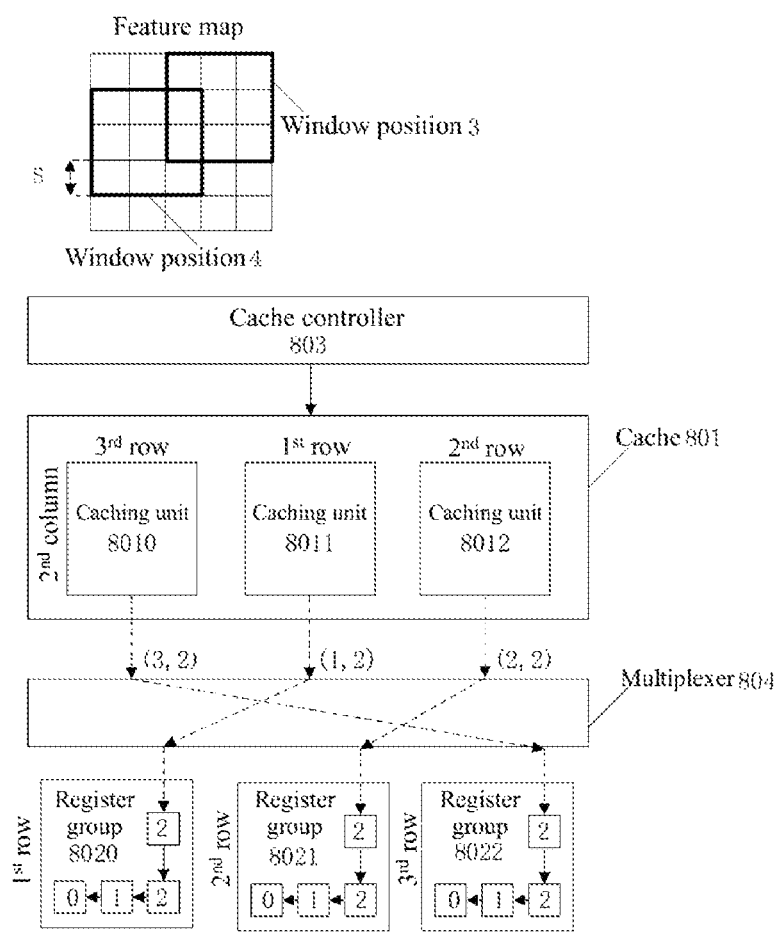

In FIGS. 9b to 9d, as described with reference to FIGS. 8a to 8c, when the window starts to slide in the $1^{st}$ row to the $3^{rd}$ row of the feature map, the caching units 8010 to 8012 output, column by column, the matrix corresponding to the window at the window position 4 to the register groups 8020 to 8022. In particular, FIG. 9b shows the shifting of the $0^{th}$ column in the $1^{st}$ row to the $3^{rd}$ row of the feature map to the calculation registers of the register groups 8020 to 8022; FIG. 9c shows the shifting of the $1^{st}$ column in the $1^{st}$ row to the $3^{rd}$ row of the feature map to the calculation registers of the register groups 8020 to 8022; and FIG. 9d shows the shifting of the 2nd column in the $1^{st}$ row to the $3^{rd}$ row of the feature map to the calculation registers of the register groups 8020 to 8022.

Figure 9E:
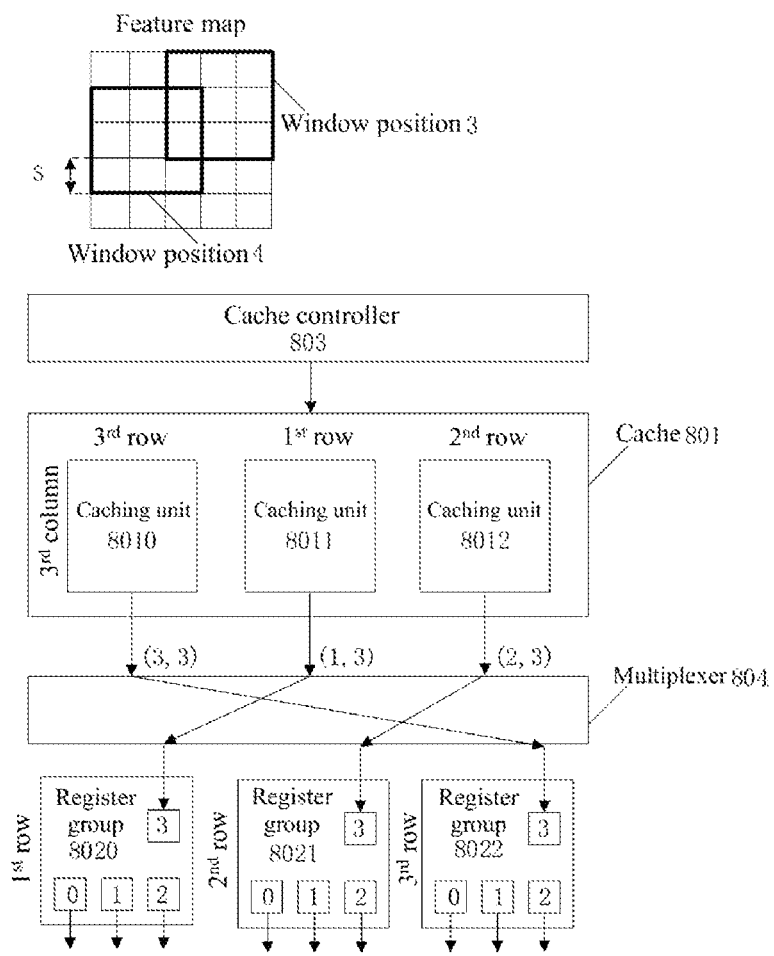

In FIG. 9e, as described with reference to FIG. 8d, the calculation registers of the register groups 8020 to 8022 output the matrix corresponding to the window that is corresponding to the window position 4.

Figure 10:
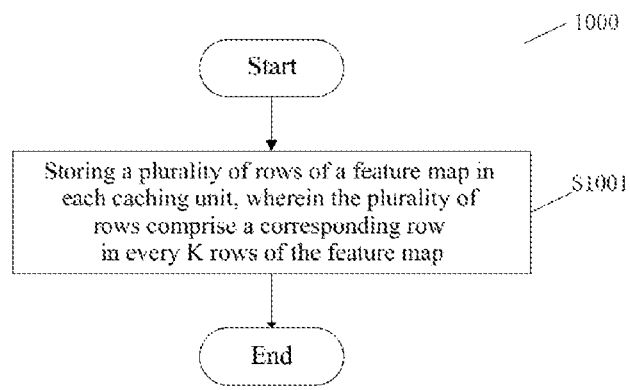
FIG. 10 shows a flow chart of a data caching method, in accordance with some embodiments, such as an exemplary embodiment.

FIG. 10 shows a flow chart of a data caching method, in accordance with some embodiments, such as an exemplary embodiment of the present disclosure. The method comprises storing data for a feature map calculated by a neural network in a cache, wherein a size of a convolution kernel of the neural network is K*K data, a window corresponding to the convolution kernel slides at a step of S in the feature map, and the cache comprises K caching units, where K is a positive integer and S is a positive integer.

In step S1001, a plurality of rows of the feature map are stored in each caching unit, wherein the plurality of rows comprise a corresponding row in every K rows (e.g., K consecutive rows) of the feature map. According to some embodiments, for each row of the feature map, a remainder obtained by dividing a row address by K corresponds to the ordinal number of a caching unit that stores said row of the feature map. In some embodiments, the data caching method of FIG. 10 is performed by a system, such as system 300, while that system is performing calculations, such as convolution calculations for a convolutional layer in a convolutional neural network.

Figure 11:
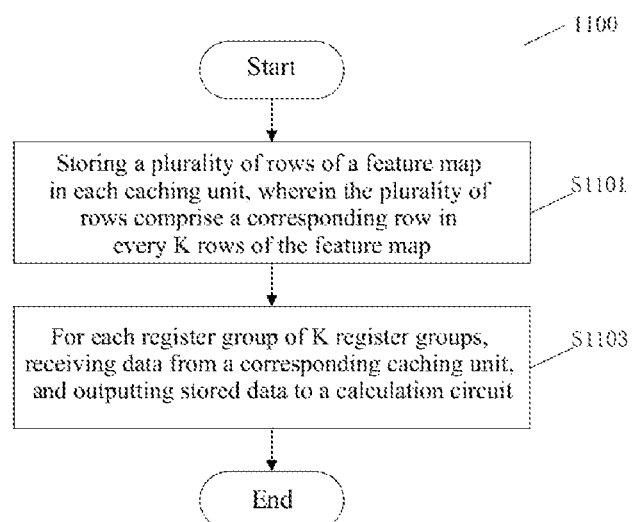
FIG. 11 shows a flow chart of a data caching method, in accordance with some embodiments, such as an exemplary embodiment.

FIG. 11 shows a flow chart of a data caching method, in accordance with some embodiments, such as an exemplary embodiment of the present disclosure. The method comprises storing data for a feature map calculated by a neural network in a cache, wherein a size of a convolution kernel of the neural network is K*K data, a window corresponding to the convolution kernel slides at a step of S in the feature map, and the cache comprises K caching units, where K is a positive integer and S is a positive integer.

In step S1101, a plurality of rows of the feature map are stored in each caching unit, wherein the plurality of rows comprise a corresponding row in every K rows (e.g., K consecutive rows) of the feature map.

In step S1103, for each register group of K register groups, data from a corresponding caching unit is received, and stored data is output to a calculation circuit. In some embodiments, the data caching method of FIG. 11 is performed by a system, such as system 300, while that system is performing calculations, such as convolution calculations for a convolutional layer in a convolutional neural network.

Figure 12:
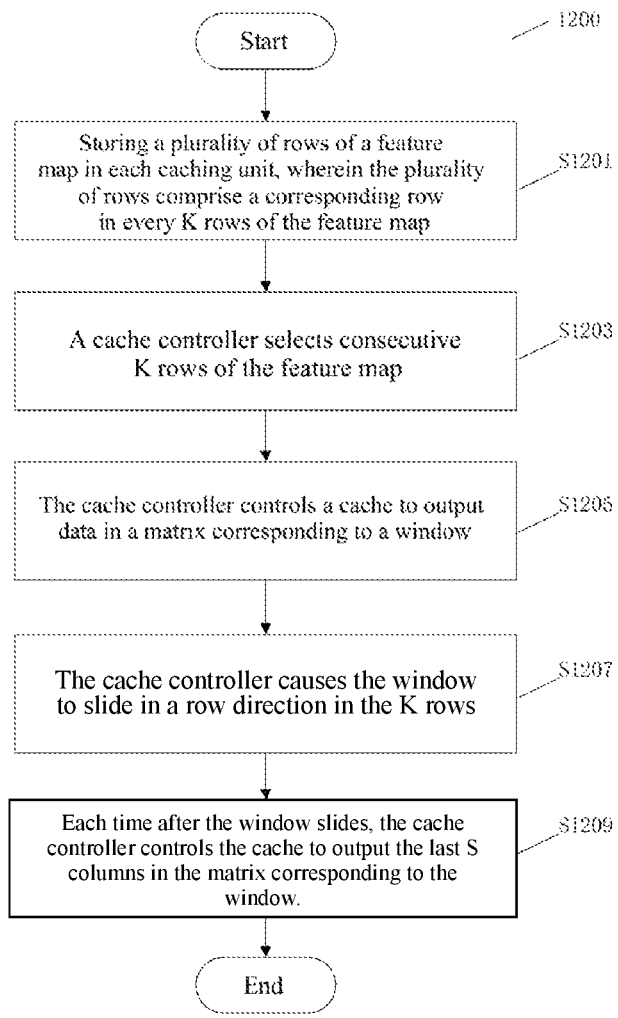
FIG. 12 shows a flow chart of a data caching method, in accordance with some embodiments, such as an exemplary embodiment.

FIG. 12 shows a flow chart of a data caching method, in accordance with some embodiments, such as an exemplary embodiment of the present disclosure. The method comprises storing data for a feature map calculated by a neural network in a cache, wherein a size of a convolution kernel of the neural network is K*K data, a window corresponding to the convolution kernel slides at a step of S in the feature map, and the cache comprises K caching units, where K is a positive integer and S is a positive integer. In some embodiments, the data caching method of FIG. 12 is performed by a system, such as system 300, while that system is performing calculations, such as convolution calculations for a convolutional layer in a convolutional neural network.

In step S1201, a plurality of rows of the feature map are stored in each caching unit, wherein the plurality of rows comprise a corresponding row in every K rows of the feature map.

In step S1203, a cache controller selects a set of K consecutive rows of the feature map, herein called "the K rows" or "the selected K rows."

In step S1205, the cache controller controls the cache to output data in a matrix corresponding to the window.

In step S1207, the cache controller causes the window to slide in the row direction in the selected K rows.

In step S1209, each time after the window slides, the cache controller controls the cache to output the last S columns in the matrix corresponding to the window. According to some embodiments, each of the K rows corresponds to a corresponding row in a corresponding caching unit of the K caching units, and for each caching unit, the cache controller controls the caching unit to output, column by column based on column addresses, data in the corresponding row.

According to some embodiments, the cache controller selects, from the $1^{st}$ row address of the feature map, a respective set of K consecutive rows in the feature map; after the window slides to the end of the respective set of K consecutive rows, the cache controller reselects rows (e.g., K consecutive rows in the feature map) from the $(S+1)^{th}$ row to the $K^{th}$ row in the respective set of K consecutive rows and S rows after the respective set of K consecutive rows in the feature map, wherein for caching units that output a row from the $1^{st}$ row to the $S^{th}$ row in the K rows, the cache controller selects a next row stored therein, and for caching units that output a row from the $(S+1)^{th}$ row to the $K^{th}$ row in the K rows, the cache controller still selects the currently selected row; and the cache controller controls the cache to output, from the $1^{st}$ column address, the reselected K consecutive rows of the feature map, wherein the cache controller controls each caching unit to output, from the $1^{st}$ column address in the selected rows, the selected rows of the feature map.

It should also be appreciated that various variations may be made according to specific requirements. For example, custom hardware may also be used, and/or specific elements may be implemented in hardware, firmware, middleware, microcodes, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the circuit principle and method in consistent with the present disclosure.

Some exemplary aspects of the present disclosure are described below.

Aspect 1. A data caching circuit being configured to cache data for a feature map calculated by a neural network, wherein a size of a convolution kernel of the neural network is K*K data, and a window corresponding to the convolution kernel slides at a step of S in the feature map, where K is a positive integer and S is a positive integer, the circuit comprising:

a cache comprising K caching units, each caching unit being configured to respectively store a plurality of rows of the feature map, the plurality of rows comprising a corresponding row in every K rows of the feature map.

Aspect 2. The circuit of Aspect 1, wherein for each row of the feature map, a remainder obtained by dividing a row address by K corresponds to the ordinal number of a caching unit that stores said row of the feature map.

Aspect 3. The circuit of Aspect 1, further comprising:

K register groups, each of the register groups being configured to receive data from a corresponding caching unit and output stored data to a calculation circuit.

Aspect 4. The circuit of Aspect 1, further comprising a cache controller, the cache controller being configured to:

select a set of K consecutive rows of the feature map ("the K rows" or "the selected K rows");

control the cache to output data in a matrix corresponding to the window;

cause the window to slide in the row direction in the selected K rows; and control, after the window slides, the cache to output the last S columns in the matrix corresponding to the window.

Aspect 5. The circuit of Aspect 4, wherein each of the K rows corresponds to a corresponding row in a corresponding caching unit of the K caching units, and the cache controller is further configured to:

for each caching unit, control the caching unit to output, column by column based on column addresses, data in the corresponding row.

Aspect 6. The circuit of Aspect 5, wherein the cache controller is further configured to:

select, starting from the 0 row address of the feature map, a respective set of K consecutive rows of the feature map;

reselect, after the window slides to the end of the respective set of K consecutive rows, K consecutive rows from the $(S+1)^{th}$ row to the $K^{th}$ row in the respective set of K consecutive rows of the feature map and S rows after the respective set of K consecutive rows of the feature map; and control the cache to output, from the $1^{st}$ column address, the reselected K consecutive rows of the feature map.

Aspect 7. The circuit of Aspect 5, wherein the cache controller is further configured to:

after the window slides to the end of the K consecutive rows of the feature map, for a caching unit that outputs a row from the $1^{st}$ row to the $S^{th}$ row in the K consecutive rows of the feature map, select a next row stored therein, and for a caching unit that outputs a row from the $(S+1)^{th}$ row to the $K^{th}$ row in the K consecutive rows of the feature map, still select the currently selected row; and control each caching unit to output, from the $1^{st}$ column address in the selected row, the selected row of the feature map.

Aspect 8. The circuit of Aspect 3, further comprising:

a multiplexer configured to transmit data from each caching unit to a corresponding register group.

Aspect 9. The circuit of Aspect 3, wherein each register group comprises:

a write register configured to receive data from a corresponding caching unit; and a calculation register configured to receive data from the write register and output registered data to the calculation circuit.

Aspect 10. The circuit of Aspect 9, wherein each register group is configured such that:

when the register group is in a data reading mode, the write register receives data from a corresponding caching unit, and the calculation register outputs registered data to the calculation circuit, and when the register group is in a data shifting mode, the write register shifts registered data to the calculation register.

Aspect 11. The circuit of Aspect 9, wherein the calculation register comprises:

K register units, the last register unit of the K register units being configured to receive data from the write register, wherein in response to receiving the data from the write register, each of the last (K−1) register units of the K register units shifts data registered therein to a previous register unit.

Aspect 12. The circuit of Aspect 9, wherein when a row output by any caching unit changes, the calculation register in each register group is cleared.

Aspect 13. The circuit of Aspect 1, wherein each data in the feature map comprises data with the same two-dimensional address on all channels, the two-dimensional address of each data comprising a row address and a column address of the data.

Aspect 14. The circuit of Aspect 1, wherein the cache comprises a random access memory (RAM).

Aspect 15. The circuit of Aspect 3, wherein the calculation circuit is a vector-matrix multiplication calculation circuit or a storage and calculation integrated circuit.

Aspect 16. A data caching method, performed by an information processing device or system (such as system 300), that stores data for a feature map calculated by a neural network (e.g., implemented in the information processing device or system) in a cache (e.g., of the information processing device or system), wherein a size of a convolution kernel of the neural network is K*K data, a window corresponding to the convolution kernel slides at a step of S in the feature map, and the cache comprises K caching units, where K is a positive integer and S is a positive integer, the method comprising:

storing a plurality of rows of the feature map in each caching unit, the plurality of rows comprising a corresponding row in every K consecutive rows of the feature map. In some embodiments, the data caching is performed by the information processing device or system, such as system 300, while that device or system is performing calculations, such as convolution calculations for a convolutional layer in a convolutional neural network.

Aspect 17. The method of Aspect 16, wherein:

for each row of the feature map, a remainder obtained by dividing a row address by K corresponds to the ordinal number of a caching unit that stores said row of the feature map.

Aspect 18. The method of Aspect 16, further comprising:

for each of K register groups, receiving data from a corresponding caching unit, and outputting stored data to a calculation circuit.

Aspect 19. The method of Aspect 16, further comprising:

selecting, by a cache controller, K consecutive rows of the feature map;

controlling, by the cache controller, the cache to output data in a matrix corresponding to the window;

causing, by the cache controller, the window to slide in the row direction in the K consecutive rows; and controlling, by the cache controller, the cache to output the last S columns in the matrix corresponding to the window each time after the window slides.

Aspect 20. The method of Aspect 19, wherein each of the K consecutive rows corresponds to a corresponding row in a corresponding caching unit of the K caching units, and the method further comprising:

controlling, by the cache controller for each caching unit, the caching unit to output, column by column based on column addresses, data in the corresponding row.

Aspect 21. The method of Aspect 20, further comprising:

selecting, by the cache controller, starting from the $1^{st}$ row address of the feature map, a respective set of K consecutive rows;

reselecting, by the cache controller, K consecutive rows, from the $(S+1)^{th}$ row to the $K^{th}$ row in the respective set of K consecutive rows and S rows below the respective set of K rows, after the window slides to the end of the respective set of K consecutive rows; and controlling, by the cache controller, the cache to output, from the $1^{st}$ column address, the reselected K consecutive rows.

Aspect 22. The method of Aspect 20, further comprising:

selecting, by the cache controller for each of caching units that output rows from the $1^{st}$ row to the $S^{th}$ row in the K consecutive rows, a next row stored therein, and still selecting, by the cache controller for caching units that output rows from the $(S+1)^{th}$ row to the $K^{th}$ row in the K rows, the currently selected rows, after the window slides to the end of the K rows; and controlling, by the cache controller, each caching unit to output, from the $1^{st}$ column address in the selected rows, the selected rows.

Aspect 23. The method of Aspect 18, further comprising:

transmitting, by a multiplexer, data from each caching unit to a corresponding register group.

Aspect 24. The method of Aspect 18, wherein each register group comprises a write register and a calculation register, and the method further comprising:

receiving, by the write register, data from a corresponding caching unit;

receiving, by the calculation register, data from the write register, and outputting registered data to the calculation circuit.

Aspect 25. The method of Aspect 24, further comprising:

receiving, by the write register, data from a corresponding caching unit when the register group is in a data reading mode, and outputting, by the calculation register, registered data to the calculation circuit; and shifting, by the write register, registered data to the calculation register when the register group is in a data shifting mode.

Aspect 26. The method of Aspect 24, wherein the calculation register comprises K register units, and the method further comprising:

receiving, by the last register unit of the K register units, data from the write register, wherein in response to receiving the data from the write register, each of the last (K−1) register units of the K register units shifts data registered therein to a previous register unit.

Aspect 27. The method of Aspect 24, further comprising:

clearing the calculation register in each register group when a row output by any caching unit changes.

Aspect 28. The method of Aspect 16, wherein each data in the feature map comprises data with the same two-dimensional address on all channels, the two-dimensional address of each data comprising a row address and a column address of the data.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A data caching circuit configured to cache data of a feature map calculated by a neural network, wherein a size of a convolution kernel of the neural network is K*K data, and a window corresponding to the convolution kernel slides at a step of S in the feature map, where K is a positive integer and S is a positive integer, the circuit comprising:

a cache comprising K caching units, each caching unit being configured to respectively store a plurality of rows of the feature map, the plurality of rows comprising a corresponding row in every K consecutive rows of the feature map.

2. The circuit of claim 1, wherein for each row of the feature map, a remainder obtained by dividing a row address by K corresponds to the ordinal number of a caching unit that stores said row of the feature map.

3. The circuit of claim 1, further comprising:

K register groups, each of the register groups being configured to receive data from a corresponding caching unit and output stored data to a calculation circuit.

4. The circuit of claim 1, further comprising a cache controller, the cache controller being configured to:

select K consecutive rows of the feature map;

control the cache to output data in a matrix corresponding to the window;

cause the window to slide in the row direction in the K consecutive rows; and control, after the window slides, the cache to output the last S columns in the matrix corresponding to the window.

5. The circuit of claim 4, wherein each of the K consecutive rows corresponds to a corresponding row in a corresponding caching unit of the K caching units, and the cache controller being further configured to:

for each caching unit, control the caching unit to output, column by column based on column addresses, data in the corresponding row.

6. The circuit of claim 5, wherein the cache controller is further configured to:

select, starting from the $1^{st}$ row address of the feature map, a respective set of K consecutive rows of the feature map;

reselect, after the window slides to the end of the respective set of K consecutive rows, K consecutive rows from the $(S+1)^{th}$ row to the $K^{th}$ row in the respective set of K consecutive rows of the feature map and S consecutive rows after the respective set of K consecutive rows of the feature map; and control the cache to output, from the $1^{st}$ column address, the reselected K consecutive rows of the feature map.

7. The circuit of claim 5, wherein the cache controller is further configured to:
after the window slides to the end of the K consecutive rows of the feature map, for a caching unit that outputs a row from the $1^{st}$ row to the $S^{th}$ row in the K consecutive rows of the feature map, select a next row stored therein, and for a caching unit that outputs a row from the $(S+1)^{th}$ row to the $K^{th}$ row in the K consecutive rows of the feature map, still select the currently selected row; and
control each caching unit to output, from the $1^{st}$ column address in the selected row, the selected row of the feature map.

8. The circuit of claim 3, further comprising:
a multiplexer configured to transmit data from each caching unit to a corresponding register group.

9. The circuit of claim 3, wherein each register group comprises:
a write register configured to receive data from a corresponding caching unit; and
a calculation register configured to receive data from the write register and output registered data to the calculation circuit.

10. The circuit of claim 9, wherein each register group is configured such that
when the register group is in a data reading mode, the write register receives data from a corresponding caching unit, and the calculation register outputs registered data to the calculation circuit, and
when the register group is in a data shifting mode, the write register shifts registered data to the calculation register.

11. The circuit of claim 9, wherein the calculation register comprises:
K register units, the last register unit of the K register units being configured to receive data from the write register,
wherein in response to receiving the data from the write register, each of the last (K−1) register units of the K register units shifts data registered therein to a previous register unit.

12. The circuit of claim 9, wherein when a row output by any caching unit changes, the calculation register in each register group is cleared.

13. The circuit of claim 1, wherein each data in the feature map comprises data with a same two-dimensional address on all channels, the two-dimensional address of each data comprising a row address and a column address of the data.

14. The circuit of claim 1, wherein the cache comprises a random access memory (RAM).

15. The circuit of claim 3, wherein the calculation circuit is a vector-matrix multiplication calculation circuit or a storage and calculation integrated circuit.

16. A data caching method, performed by an information processing device or system, that stores data of a feature map calculated by a neural network implemented in the information processing device or system, in a cache, wherein a size of a convolution kernel of the neural network is K*K data, a window corresponding to the convolution kernel slides at a step of S in the feature map, and the cache comprises K caching units, where K is a positive integer and S is a positive integer, the method comprising:
storing a plurality of rows of the feature map in each caching unit, the plurality of rows comprising a corresponding row in every K consecutive rows of the feature map.

17. The method of claim 16, wherein
for each row of the feature map, a remainder obtained by dividing a row address by K corresponds to the ordinal number of a caching unit that stores said row of the feature map.

18. The method of claim 16, further comprising:
for each of K register groups, receiving data from a corresponding caching unit, and outputting stored data to a calculation circuit.

19. The method of claim 16, further comprising:
selecting, by a cache controller, K consecutive rows of the feature map;
controlling, by the cache controller, the cache to output data in a matrix corresponding to the window;
causing, by the cache controller, the window to slide in the row direction in the K consecutive rows; and
controlling, by the cache controller, the cache to output the last S columns in the matrix corresponding to the window each time after the window slides,
wherein each of the K consecutive rows corresponds to a corresponding row in a corresponding caching unit of the K caching units, and for each caching unit, the cache controller controls the caching unit to output, column by column based on column addresses, data in the corresponding row.

20. The method of claim 19, wherein
the cache controller selects, starting from the $1^{st}$ row address of the feature map, a respective set of K consecutive rows,
after the window slides to the end of the respective set of K consecutive rows, the cache controller reselects K consecutive rows, from the $(S+1)^{th}$ row to the $K^{th}$ row in the K consecutive rows and S consecutive rows after the respective set of K rows, wherein for a caching units that outputs a row from the $1^{st}$ row to the $S^{th}$ row in the reselected K consecutive rows, the cache controller selects a next row stored therein, and for caching units that outputs a row from the $(S+1)^{th}$ row to the $K^{th}$ row in the K consecutive rows, the cache controller still selects the currently selected row, and
the cache controller controls the cache to output, from the $1^{st}$ column address, the reselected K consecutive rows, wherein the cache controller controls each caching unit to output, from the $1^{st}$ column address in a selected row, the selected row.

* * * * *